C. JOHNSON.
ACETYLENE TORCH.
APPLICATION FILED MAY 2, 1912.
1,147,403.
Patented July 20, 1915.
3 SHEETS—SHEET 1.
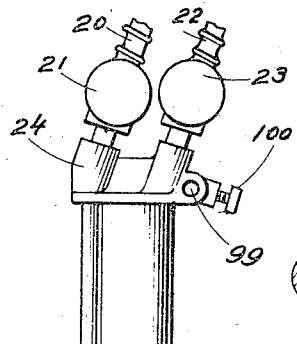
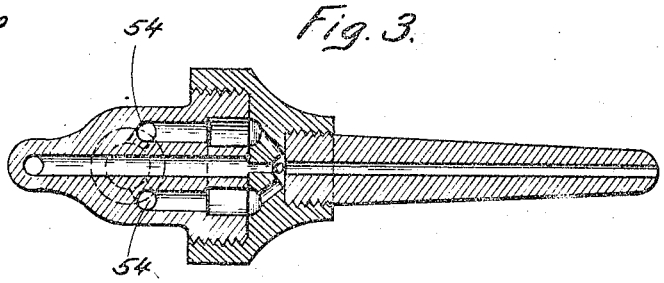
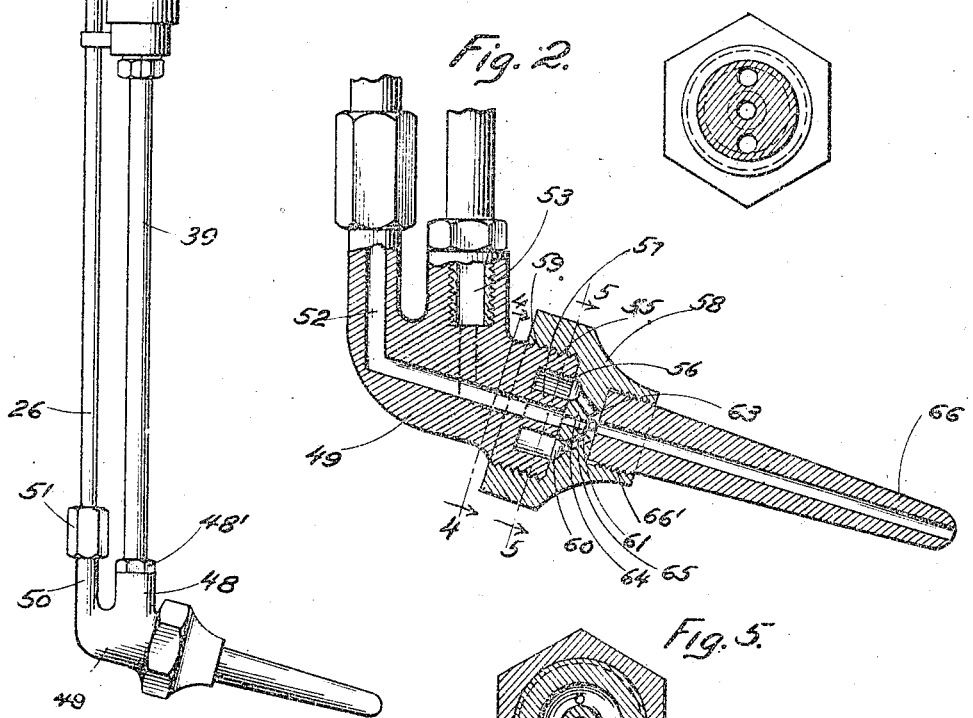
Witnesses:
C. C. Burnap
Henry A. Parks
Inventor
Carl Johnson
By Sheridan, Wilkinson, Scott & Richmond Attys C. JOHNSON.
ACETYLENE TORCH.
APPLICATION FILED MAY 2, 1912.
1,147,403.
Patented July 20, 1915.
3 SHEETS—SHEET 2.
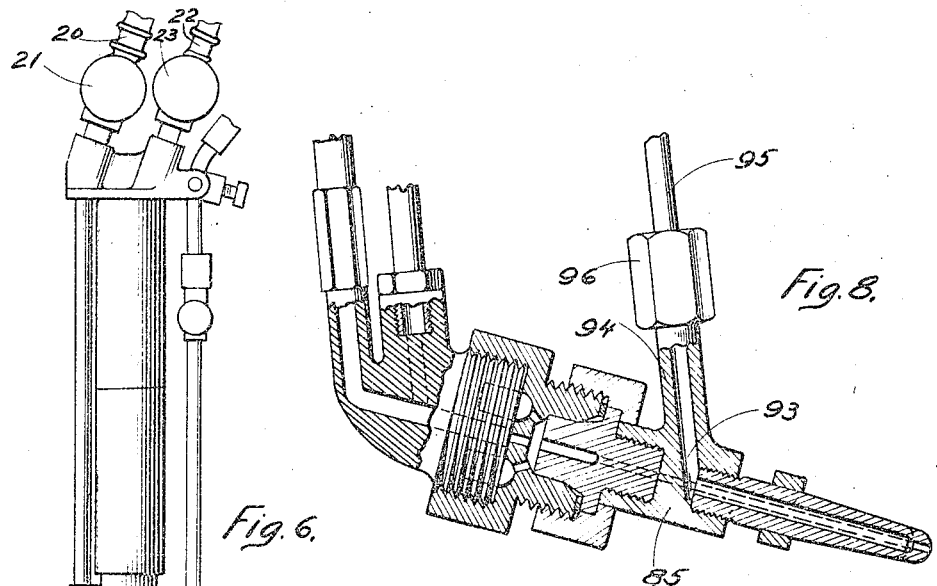
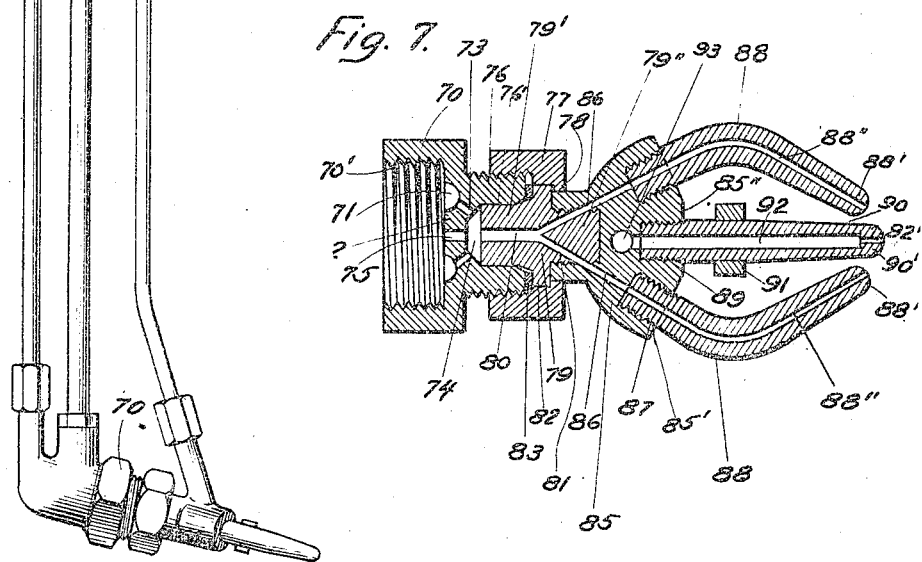
Witnesses:
Inventor:
Carl Johnson

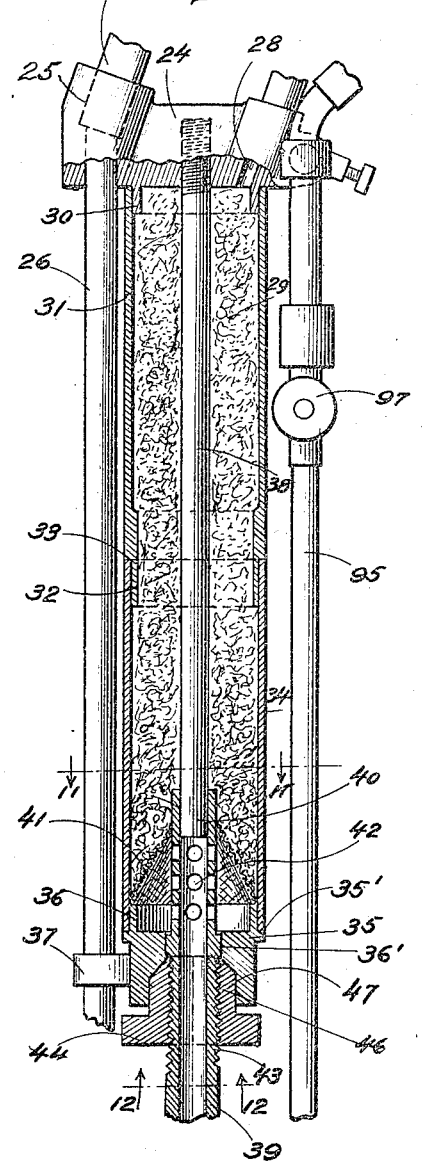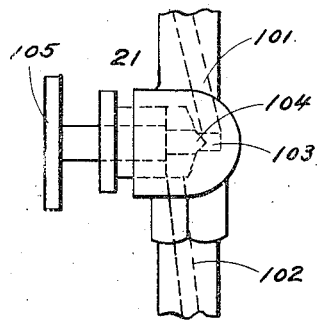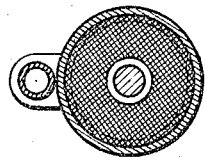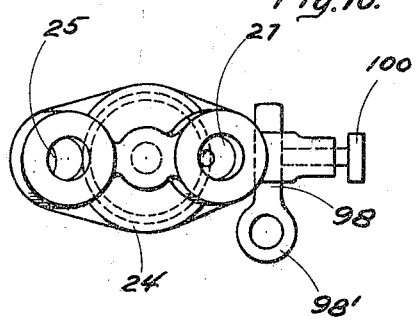

UNITED STATES PATENT OFFICE.

CARL JOHNSON, OF CHICAGO, ILLINOIS.

ACETYLENE-TORCH.

1,147,403.  Specification of Letters Patent.  Patented July 20, 1915.

Application filed May 2, 1912. Serial No. 694,706.

*To all whom it may concern:*

Be it known that I, CARL JOHNSON, a citizen of the United States, residing at Chicago, in the county of Cook and State of Illinois, have invented certain new and useful Improvements in Acetylene-Torches, of which the following is a specification.

This invention relates to improvements in acetylene torches.

The principal object of this invention is to provide an improved torch for use either in welding or in cutting metal.

Another object of this invention is to provide an improved construction whereby the device may be readily changed from a welding to a cutting torch.

Another object of the invention is to provide an improved construction of filtering chamber.

Other objects will be made clear in the following specification taken in connection with the accompanying drawings, in which—

Figure 1 is a side elevation of my device as used for welding. Fig. 2 is a longitudinal section of the welding burner and head. Fig. 3 is a section taken at right angles to the section of Fig. 2. Fig. 4 is a transverse section taken along the line 4—4 of Fig. 2. Fig. 5 is a transverse section taken along the line 5—5 of Fig. 2. Fig. 6 is a side elevation of my device when used as a cutting torch. Fig. 7 is a longitudinal section through the burner attachment shown in Fig. 6. Fig. 8 is a section taken at right angles to that of Fig. 7. Fig. 9 is a section through the improved filtering device. Fig. 10 is an end view of the head of the filtering device. Fig. 11 is a transverse section taken on the line 11—11 of Fig. 9. Fig. 12 is a similar view along the line 12—12 of Fig. 9; and Fig. 13 is a side elevation of the form of valve used in connection with my device.

Like numerals refer to like elements throughout the drawings.

In the use of my device I contemplate using separate supplies of acetylene gas and oxygen gas, as is customary, but I have not considered it necessary to show the tanks, etc., containing these gases. The tube 20 is adapted to be connected to a source of oxygen supply, the passage of gas through this tube being regulated by the valve 21. A similar tube 22 is adapted to be connected to a source of acetylene gas, the flow through which is also controlled by a valve 23, similar to the valve 21. These tubes communicate with a head 24, shown in enlarged view in Fig. 10. At its upper portion the head is provided with an aperture or socket 25, through which is inserted the end of the tube 20. Communicating with this tube, through a socket 25, is the acetylene pipe 26. At the lower portion of the head a socket 27 is provided, terminating in an aperture 28, which communicates with the interior of the chamber 29; and at one side of said head is provided a circular or annular flange 30, on which is seated a cylinder or tube 31. At the opposite end of this tube 31 is a reduced portion 32, this reduced portion and the main body of the tube 31 forming a shoulder 33. A second tube or cylinder 34 closely fits the reduced portion 32 and abuts at its extremity against the shoulder 33 to form an air-tight connection. At the opposite end of the tube 34 is a cap 35 of peculiar construction. This cap is formed with an annular flange 36, on which is closely fitted one end of the tube 34, as shown in Fig. 9. The shoulder 35' formed on the flange 35 eliminates the movement of and furnishes a seat for the end of the tube 34. The cap is also provided with a central aperture 36' extending therethrough.

Secured to the outer portion of the cap and extending upwardly therefrom is a boss 37, centrally apertured to furnish a journal for the acetylene pipe 26 shown in Fig. 9. A rod 38, located centrally of said tubes 31 and 34, is threaded into engagement with the central portion of the head at one end, and terminates at its other end adjacent the end of the tube 34. A pipe 39 extends through the aperture 36' in the cap, and is of slightly less diameter adjacent its inner end, which projects into the tube 34. The end of the rod 38 projects into the end of the tube 39 at 40, and is securely brazed or otherwise fastened thereto. A conical screen 41 is carried interiorly of the tube 34 adjacent the cap.

The tube 39 is provided with a plurality of apertures 42 adjacent its end and underneath the screen, this tube being exteriorly threaded, as shown at 43, and adapted to be engaged by an internally threaded split nut 44, shown in Fig. 12. This split nut is provided with a hexagonal collar 45 and an internally projecting portion 46, which coact with and closely fit the recessed portion 47 of the cap.

The interior of the tubes 31 and 34 is adapted to be filled with mineral wool or other filtrant, the conical screen serving to keep the filtrant clear of the apertures 42.

It will be seen that by placing together the sections of the split nut 44 and engaging their interiorly threaded portion with the portion 43, said nut in its entirety may be threaded into engagement with the cap 35, when it will, through the medium of said cap and the rod 38, serve to retain the sections of the filtering chamber in closely assembled relation. It will also be seen that acetylene gas admitted through the aperture 28 in the head will of necessity have to pass through the mineral wool or other filtrant, through the screen 41 and into the apertures 42, and hence through the acetylene tube 39, which is secured at its other extremity to an elbow 48, angularly projecting from an integrally formed main head 49. A similar elbow 50, parallel with 48 and located upwardly thereof, furnishes a connection for the extremity of the oxygen pipe, to which it may be secured by the coupling nut 51, as shown in Fig. 1. The locking nut 48' serves to hold the end of the pipe 39 in position with respect to the elbow 48,—as shown in Fig. 1—the end of said pipe being threaded into the elbow, as shown in Fig. 2.

Leading from the pipe 26, formed in the elbow 50 and main head 49, is a duct 52. The elbow 48 is similarly provided with a duct 53, from which lead bifurcated ducts 54. The main head 49 is provided in its lower portion with a threaded flange 55. At this extremity of the head is formed the annular channel 56 surrounding a centrally projecting boss 57, through which is formed the duct 52. The bifurcated ducts 54 communicate with the annular channel 56 on either side of the projection 57, as shown in Fig. 3 of the drawings.

When used for welding, a cap 58, internally threaded at 59 to engage the threaded flange 55, is provided. This cap is provided with an annular groove 60 adapted to register with the lower portion of the channel 56, as shown in Fig. 2. Leading from this groove are a plurality of passages 61, as shown in Fig. 2, these passages terminating in a mixing chamber 63. A centrally located projection 64 is formed by the annular groove 60 in the cap 58, and through this projection is formed a central passage 65 leading from the duct 52 to the mixing chamber. The cap 58 is internally apertured and threaded at its lower portion and is engaged by the threaded portion 66' of the burner 66.

It will be seen in this construction that oxygen conveyed through the pipe 26 will pass through the duct 52 in the main head 49 to the mixing chamber, and will be mixed therein with the acetylene gas conveyed through the pipe 39, ducts 54, channel 56, and passages 61. This provides a construction capable of use for welding where a single flame of mixed acetylene and oxygen is used. Where it is intended to use a metal cutting torch, however, I provide a slightly different structure, as shown in Figs. 6, 7, 8, and 9. In place of the cap 58, shown in Fig. 2, I substitute a cap 70, internally threaded at 70' to engage the threaded portion 59 of the main head 49. An annular groove 71 registers with the annular channel 56 in the head 49 and forms a central projection 72 abutting against the extremity of the boss 57 of the head 49.

Leading from the groove in the cap 70 are a plurality of apertures 73 leading to a mixing chamber 74. A central aperture 75, formed in the centrally located projection 72, is adapted to lead from the duct 52 to the mixing chamber 74. The cap is provided with a depending boss portion 76 externally threaded and engaged by the internally threaded portion of the coupling nut 77, which is provided with an internally projecting flange 78 adjacent its lower extremity. A union member 79 is provided with an upwardly projecting portion 79', in which is located the passage 80 and the downwardly projecting portion 79'' in which are located the bifurcated ducts 81. The portion 79' closely fits and projects upwardly into the central aperture 76' formed in the portion 76 of the cap 70. The union member 79 is provided with a circular flange 82, seated in the seat formed by the flange 78 of the coupling end 77. A packing washer 83 is carried on the upper face of the flange 82. This washer is adapted to abut against the lower face of the portion 76 of the member 70.

It will be seen that by means of the threaded engagement between the members 77 and 70, the member 70 may be utilized to hold the union 79 in close assembled relation with the cap 70, the washer 83 furnishing a gas-tight connection therewith. The depending portion 79'' of the member 79 is externally threaded and is engaged by a burner head 85, as shown in Fig. 7. This burner head is provided with a pair of bifurcated ducts 86, adapted to register and communicate with the bifurcated ducts 81. The burner head is provided with diverging faces 85' located on either side of the central face 85'', as shown in Fig. 7. Sockets 87 are provided in the burner head inwardly of the faces 85'. These sockets are threaded and are engaged by the threaded portions of the burners 88 the axes thereof extending outwardly at right angles to the faces 85' adjacent their connection with the burner head. These burners are curved adjacent their central portions so as to cause their outer portions to mutually converge, as shown in Fig. 7. The burner head 85 is further provided with a centrally located socket 89, in which is threadedly attached the central burner or cutting tip 90, having its tip 90' terminating adjacent the tips 88' of the burners 88. This central burner is provided with a collar 91. A comparatively large duct or passage 92 is formed in the tip 90, communicating at one end with the duct 93 formed in the burner head 85, as shown in Figs. 7 and 8. At its other extremity the duct 92 is reduced to form a portion 92'. The burner head is provided with an angularly disposed elbow 94, to which a second oxygen pipe 95 may be connected by means of the union nut 96, as shown in Fig. 8. This pipe is provided with a valve 97, and is adapted to be connected to the source of oxygen supply. To provide for the support of the pipe 95, a pin 98 is detachably seated in an aperture 99 in the lower portion of the head 24, as shown in Fig. 1. A screw 100 is threadedly wound in the lower portion of the head and is adapted to hold the pin 98 in place. This pin is provided at its outer extremity with a collar 98' adapted to permit of the location therein of the pipe 95, as shown in Figs. 6 and 9 of the drawings. It will thus be seen that in this second construction a supply of gas and acetylene are commingled in the mixing chamber 74 and conducted through the ducts 88'' in the curved burners 88, while a supply of pure oxygen is conveyed through the pipe 95 to and through the cutting tip 90, the ends of the burners 88 and cutting tip 90 being arranged to terminate adjacent each other, as shown in Fig. 7. This arrangement gives the flame desired for cutting metal.

In Fig. 13 I have illustrated a form of valve capable of use in connection with the control of the passage of gases. This valve I have designated generally by the numeral 21. The offset passages 101 and 102 are shown in dotted lines, a vertical passage 103 connecting them. A needle valve 104 is seated adjacent the connection of the passage 103 with the passage 101. By rotating the valve head 105 the flow of gas from the passage 101 to passage 102 may be readily controlled as desired.

It is believed that the operation of the above device is sufficiently set forth in the preceding specification. It will be understood, however, that while I have shown my invention in a more or less specific form and have described the same specifically, I do not desire to be restricted to either the showing or the above description, beyond the scope of the appended claims.

I claim:—

1. In a device of the class described, an oxygen supply pipe and an acetylene supply pipe, a head in which each of said pipes terminates, said head being provided with a duct communicating with the oxygen pipe, and a second duct communicating with the acetylene pipe, said second duct being bifurcated to form a pair of ducts located one on each side of the first named duct.

2. In a device of the class described, an oxygen supply pipe and an acetylene supply pipe, a head in which each of said pipes terminates, said head being provided with a duct communicating with the oxygen pipe and a second duct communicating with the acetylene pipe, said second duct being bifurcated to form a pair of ducts located one on each side of the first named duct, said head being provided with an annular chamber located adjacent one extremity, the branches of said bifurcated ducts terminating at their ends opposite said second named duct in said chamber and the first named duct projecting through the projection formed by the annular chamber.

3. In a device of the class described, an oxygen supply pipe and an acetylene supply pipe, a head in which each of said pipes terminates, said head being provided with a duct communicating with the oxygen pipe, a second duct communicating with the acetylene pipe, said second duct being bifurcated to form a pair of ducts located one on each side of the first named duct, said head being provided with an annular chamber located adjacent one extremity, the branches of said bifurcated ducts terminating in said chamber, the first named duct projecting through the projection formed by the annular chamber, a cap detachably secured to the chambered extremity of said head, said cap being provided with a passage communicating with the oxygen duct and with a plurality of passages communicating with said annular chamber in said head.

4. In a device of the class described, an oxygen supply pipe and an acetylene supply pipe, a head in which each of said pipes terminates, said head being provided with a duct communicating with the oxygen pipe, a second duct communicating with the acetylene pipe, said second duct being bifurcated to form a pair of ducts located one on each side of the first named duct, said head being provided with an annular chamber located adjacent one extremity and the branches of said bifurcated ducts terminating in said chamber, the first named duct projecting through the projection formed by the annular chamber, a cap detachably secured to the chambered extremity of said head, said cap being provided with a mixing chamber, said cap being further provided with a passage communicating with the oxygen duct and with a plurality of passages communicating with said annular chamber in said head, and a burner member detachably secured to said cap and communicating with said mixing chamber.

5. In a device of the class described, a head, an acetylene supply pipe and an oxygen pipe communicating with said head, said head being provided with ducts leading from said pipes, a cap detachably secured to said head, said cap having a mixing chamber and being provided with passages leading from said ducts in said head to said mixing chamber, a coupling member, means to secure said coupling member to said cap, said coupling member being provided with a bifurcated duct leading from said mixing chamber, a pair of burners detachably secured to said coupling member, and having passages communicating with the branches of said bifurcated duct in said coupling member, and a third centrally located cutting tip carried by said coupling member, said cutting tip having its extremity terminating adjacent the extremities of said first named burners, and an oxygen supply pipe communicating with said cutting tip.

6. In a device of the class described, a head, a cap detachably engaging said head, a coupling member engaging said cap, and a burner head detachably engaging said coupling member with a plurality of burners detachably secured in said burner head, said burners having their free extremities converging toward, and terminating adjacent each other.

7. In a device of the class described, a cap having a mixing chamber therein, a burner head, means to secure said burner head to said cap, a pair of angular burners detachably secured to said burner head, and a cutting tip arranged between said first named burners, said angular burners being arranged to communicate with said mixing chamber, said cutting tip being arranged to communicate with a separate source of gas.

8. In a device of the class described, a head having an annular chamber in one end thereof and a plurality of ducts leading to said chamber, a cap carried by said head and having an annular groove in one end thereof adapted to register with said annular chamber in said head, said cap having a mixing chamber in the other end thereof, said cap being further provided with passages leading from said annular groove to said mixing chamber.

In testimony whereof, I have subscribed my name.

CARL JOHNSON.

Witnesses:
HENRY A. PARKS,
F. A. FLORELL.